United States Patent [19]

Charrow

[11] Patent Number: 4,800,669
[45] Date of Patent: Jan. 31, 1989

[54] SPINNER BLADES FOR USE IN WATER OR AIR

[76] Inventor: John R. E. Charrow, P.O. Box 530, Red Lake, Ontario, Canada, P0V 2M0

[21] Appl. No.: 66,310

[22] Filed: Jun. 25, 1987

[30] Foreign Application Priority Data

Jul. 16, 1986 [CA] Canada ............................ 513880

[51] Int. Cl.⁴ .......................................... A01K 85/04
[52] U.S. Cl. ................................. 43/42.19; 43/42.17
[58] Field of Search ................. 43/42.17, 42.19, 42.16, 43/42.51, 42.36, 42.05

[56] References Cited

U.S. PATENT DOCUMENTS

| | | | |
|---|---|---|---|
| D. 160,643 | 10/1950 | Marbourg | 43/42.19 |
| 716,451 | 12/1902 | Mantz | 43/42.17 |
| 849,743 | 4/1907 | Martin | 43/42.19 |
| 1,666,072 | 4/1928 | Schilpp . | |
| 1,740,273 | 12/1929 | Shannon . | |
| 1,996,477 | 4/1935 | Lauby . | |
| 2,214,668 | 9/1940 | Erickson | 43/42.36 |
| 2,238,292 | 4/1941 | Schavey . | |
| 2,265,482 | 12/1941 | Hearn . | |
| 2,429,568 | 10/1947 | Stevermer | 43/42.17 |
| 2,585,494 | 2/1952 | Pelto . | |
| 2,708,805 | 5/1955 | Garvie | 43/42.19 |
| 2,783,579 | 3/1957 | Casper . | |
| 4,016,671 | 4/1977 | Larsen . | |
| 4,320,592 | 3/1982 | Kirsch | 43/42.19 |

FOREIGN PATENT DOCUMENTS 1060375 4/1954 France ................. 43/42.19

Primary Examiner—Kurt Rowan
Attorney, Agent, or Firm—Murray E. Thrift; Stanley G. Ade; Adrian D. Battison

[57] ABSTRACT

A spinner for fishing lures comprises a relatively lightweight, substantially rigid disc having a fold line extending across the disc whereby the two parts separated by the fold line may be angulated towards one another with an included angle of between approximately 90° and approximately 160° and having a line aperture through one portion adjacent one end of the fold line but spaced between the fold line and the periphery of the one portion so that it spins relatively easily upon a line when moved through the water. A curved segment may be removed from said one portion for balance and to facilitate easy rotation at relatively low trolling speeds.

11 Claims, 1 Drawing Sheet

SPINNER BLADES FOR USE IN WATER OR AIR

BACKGROUND OF THE INVENTION

This invention relates to new and useful improvements in spinner blades, particularly spinner blades used in fishing lure assemblies having a spinner mounted thereon for rotation as said lure is drawn through the water.

However the blade design is also available for use in air such as in a child's windmill for example. Conventionally, in fishing lures, such spinners are teardrop shaped and are manufactured from metal which is either metal plated or coloured depending upon the design of the lure.

These metal spinners are relatively heavy and a minimum speed must be obtained through the water in order to rotate same and such spinner cannot be used in air for other purposes. They also rust or corrode badly particularly when used in salt water. However, aluminum alloy or other thin metal may be used in fresh water.

It is well known that a relatively low travelling speed of the lure facilitates the catching of fish so that one of the objectives of the present invention is to provide a spinner blade on a fishing lure assembly which will rotate when drawn through the water at a much lower speed than conventional metal spinners. In fact, the blade will rotate with the minimum of relative speed and, due to the lightness of the blade, can be rotated by the movement of a live minnow when used as bait and properly affixed.

As well, the rotation of the spinner is facilitated by the formation of the spinner as will hereinafter be described and can be adjusted readily and easily.

PRIOR ART

U.S. Pat. No. 1,666,072, C. P. Schilpp shows a metal spinner formed by slitting a disk and then spreading the leg portions apart.

U.S. Pat. No. 1,740,273, J. P. Shannon shows a metal spinner with an upturned leg portion.

U.S. Pat. No. 1,996,477, A. G. Lauby shows a buoyant spoon.

U.S. Pat. No. 2,238,292, E.C. Schavey shows a metal spinner with a posed wings folded along the longitudinal axis thereof.

U.S. Pat. No. 2,265,482, J. L. Hearn shows a metal spinner with two oppositely curved wings.

U.S. Pat. No. 2,585,494, A. Palto shows metal spinners with trailing wings oppositely angled or planar.

U.S. Pat. No. 2,783,579, C. Casper shows a metal plate type spoon.

U.S. Pat. No. 4,016,671, Larsen shows a generally spoon shaped blade apertured near the head end thereof with the cavity of the spoon facing the shaft.

SUMMARY OF THE INVENTION

In accordance with an aspect of the invention, a spinner blade for use in water and air, comprising a planar blade formed from relatively lightweight substantially semi-rigid sheet material, said blade have a chordal fold line thereon, said blade being angulated along said fold line to form two wings having an included angle of between 90° and 160° and a support aperture formed through one wing.

In accordance with another aspect of the invention there is provided a fishing lure assembly comprising in combination a leader, a hook on one end of said leader and a line connection loop on the other end of said leader, and a spinner blade on said leader between said hook and said line connecting loop, means on said leader to limit the movement of said spinner blade towards said hook whereby said spinner blade may rotate, said spinner blade comprising as a blade formed from lightweight, substantially semi-rigid sheet material, said blade having a chordal fold line thereacross, said disc being angulated along said fold line to form two wings having an included angle of between 90° and 160° and a line aperture formed through one wing said blade being mounted upon said leader via said aperture with said included angle facing the end of said leader opposite to said hook.

Another advantage of the invention is that the included angle between the two wings of the spinner is easily varied within limits, by the user depending upon circumstances and the rate of rotation of the spinner that is required.

Another advantage of the invention is to provide a device of the character herewithin described which is simple in construction, economical in manufacture, and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Although the spinner blade is shown and described for use with a fishing line, nevertheless it can be used in air as a toy windmill or the like.

Figure 1:
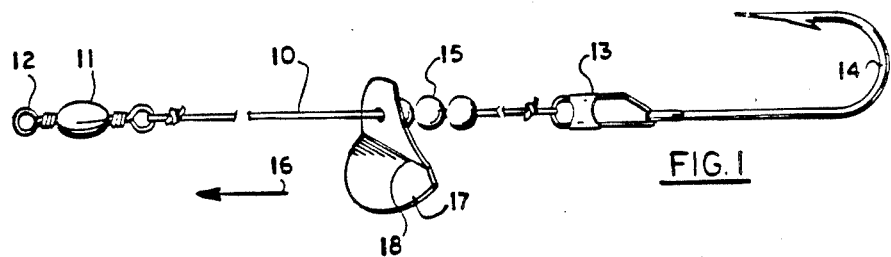
FIG. 1 is a side elevation of a fishing lure assembly with the novel spinner blade included shown in a horizontal position.

Proceeding therefore to describe the invention in detail, reference should first be made to FIG. 1 in which 10 illustrates a conventional leader made of monofilm line or the like having a swivel 11 at one end thereof and a line engaging loop 12 attached to one end of the leader in a conventional manner.

A snap hook 13 is secured to the other end of the leader and a conventional hook element 14 is detachably securable to the snap hook or may be directly connected to this end of the leader if desired.

Along the length of the leader between the snap hook and the swivel is usually provided a plurality of substantially spherical beads 15 upon which a spinner blade may bear when travelling in the direction of arrow 16 thus facilitating the rotation of the spinner blade.

Figure 2:
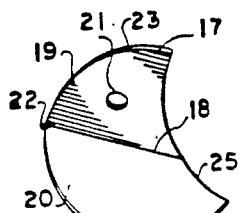
FIG. 2 is an enlarged front elevation of one of the spinner blades per se.
Figure 3:
FIG. 3 is a side elevation from the left hand side of FIG. 2.
Figure 4:
FIG. 4 is a side elevation of the spinner blade from the right hand side of FIG. 2.

The spinner blade forming the essence of the present invention is identified by reference character 17, the main embodiment being illustrated in FIGS. 2, 3 and 4.

This spinner blade takes the form of a disc stamped out of a sheet of relatively lightweight yet substantially rigid plastic or metal and is substantially circular in configuration. However, any other configuration may be used such as rectangular, triangular, star shaped or the like. A chordal fold line 18 is formed across the disc dividing the disc into two portions, a portion 19 and a further portion 20. In this particular embodiment, the portion 19 has a smaller area then the portion 20 with the portion 19 having a line engaging aperture 21 formed therethrough towards the upper or one end 22 of the chordal line and between the chordal line and the portion of the periphery 23 shown in FIG. 2 so that with the leader in a horizontal position as shown in FIG. 1, the spinner blade would hang substantially in the position shown in FIG. 2.

The two wings or portions 19 and 20 are angulated about the fold line 18 to a configuration shown in side elevation in FIG. 3 with the included angle 24 being between 90° and 160° and with the preferred included angle being 135°+/−10°.

This included angle, when the spinner blade is assembled onto the leader 10, faces the line engaging loop 12 so that when the lure assembly is moved through the water in the direction of arrow 17, the passage of the water past the spinner blade causes same to rotate around the line bearing against the uppermost bead 15.

Figure 6:
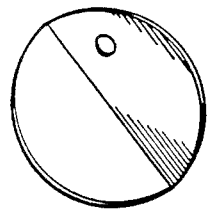
FIG. 6 is a front elevation of a further embodiment.
Figure 7:
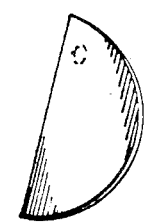
FIG. 7 is a side elevation taken from the left hand side of FIG. 6.
Figures 8, 9, 10:
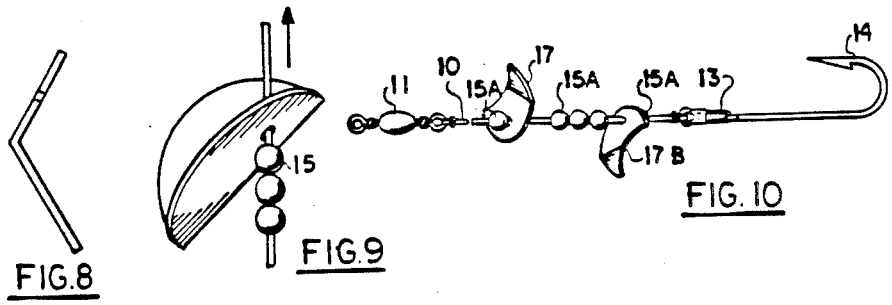
FIG. 8 is a top plan view of FIG. 7.
FIG. 9 is a fragmentary lure assembly with the novel spinner blade thereon and shown in the vertical position.
FIG. 10 is a partial side elevation similar to FIG. 1 but incorporating opposite rotating spinners.

The disc may either be a full circle as shown in FIGS. 6, 7 and 8 or may have a portion of the disc removed as shown in the remaining figures.

Figure 5:
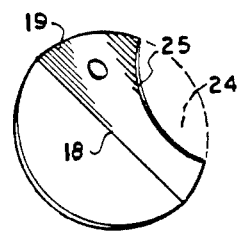
FIG. 5 is a front elevation of an alternative embodiment.

In FIG. 5, this removed portion designated 24 is defined as a convexedly curved segment thus leaving a concave line 25 on the periphery of the lure when the segment is removed. In FIG. 5 t his concave line is entirely in the one wing 19 whereas in FIG. 2, this curved line 25 extends across the fold line 18 into the other wing 20 with the major portion being removed from wing 19 and only a minor portion being removed from wing 20. However, these configurations are only illustrative and others may be used.

The spinners will rotate easily regardless of size and rotation is controlled by positioning of the fold line 18 relative to the line engaging aperature 21.

The angle of the chordal fold line, when the lure assembly is held vertically as shown in FIG. 9, always inclines downwardly and outwardly from the area of the line engaging aperture as clearly shown in FIG. 9. The position of the aperture as clearly shown in FIG. 9. The position of the aperture 21 is critical and of course depends upon the diameter of the spinner, the weight of the material and the circumstances and conditions under which the lure is being used.

The angle of inclination of the chordal fold line 18 may also be varied once again depending upon size and conditions.

The angulation of the spinner and the positioning of the line aperture 21 is such that the uppermost bead 15 always engages the rear surface of the wing through which the aperture is made so that no wedging effect occurs between the bead and the boundaries of the aperture 21.

Depending upon the finish of the sheet of material from which the spinners are formed, various patterns and colours and reflectivity can be obtain depending upon design parameters particularly when plastic sheet material is used.

FIG. 10 shows a fishing lure assembly similar to FIG. 1 but reduced in scale relative thereto. A bead 15A is provided out board of the swivel 11 and one disc or spinner blade 17 is then mounted upon the line 10 through the aperture 21 as hereinbefore described. This spinner blade may take the form of any of the examples shown and includes the causal or forward line 18 with the included angle facing in the direction opposite to that of the hook 14.

A plurality of further beads 15A are then located on the line on the side of the disc 17 towards the hook 14 where upon a further disc 17B is mounted upon the line with a bead or beads 15A engaging the line between this spinner blade 17B and the snap hook swivel 13. This second spinner blade or disc 17B is preferably similar in configuration and size to the spinner 17 but the included angle faces towards the hook 14.

This means that when the lure assembly is moved in the direction of arrow 16, the spinner blade or disc 17 will rotate in one direction but if the lure assembly is moved in a direction opposite to the arrow 16 then blade 17B will rotate and in the opposite direction.

Alternatively of course, both blades 17 and 17B may have the included angle facing in the same direction away from the hook 14 or they may be shaped and designed so that regardless of the direction of travel, one moves in one direction and the other moves in the opposite direction.

This particular configuration with the blades reversed one from the other is particularly suitable for use in jigging or ice fishing in which the lure assembly is first lowered towards the lake or river bottom and then is retrieved vertically or at a slight angle upwardly. Normally a spinner only operates on the retrieve action, i.e., when it is moving in the direction of arrow 16 but with the reverse blade assembly illustrated and described, at least one of the spinners will rotate regardless of whether the line is being let out towards the lake or river bottom or whether it is being retrieved.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A spinner blade for use in water and air, comprising a planar blade formed from relatively lightweight synthetic, substantially semi-rigid sheet material, said balde have a chordal fold line thereon, said blade being angulated along said fold line to form two wings having an included angle of between 90° and 160° and a support aperture formed through one wing, said one wing having a smaller area than said other wing, the contour of said one wing including a substantially concave segment.

2. The spinner according to claim 1 in which the included angle is 135°+/−10°.

3. The spinner blade according to claim 2 in which said support aperture in said one wing is situated towards one end of the fold line and between the fold line and the periphery of said one wing.

4. The spinner according to claim 1 in which said concave segment crosses said fold line whereby a minor part of the countour of said other wing adjacent one end of said fold line also has a concave contour.

5. A fishing lure assembly comprising in combination a leader, a hook on one end of said leader and a line connection loop on the other end of said leader, and a spinner blade on said leader between said hook and said line connecting loop, means on said leader to limit the movement of said spinner blade towards said hook whereby said spinner blade may rotate, said spinner blade comprising a disc formed from lightweight substantially semi-rigid sheet material, said disc having a chordal fold line thereacross, said disc being angulated along said fold line to form two substantially flat wings having an included angle of between 90° and 160° and a line aperture formed through one wing and situated towards one end of said fold line and between said fold line and the periphery of said one wing whereby, when said leader is held vertically, a major portion of said fold line inclines downwardly and outwardly from adjacent said line aperture, said blade being mounted upon said leader via said aperture with said included angle facing the end of said leader opposite to said hook.

6. The fishing lure assembly according to claim 5 in which the included angle is 135°+/−10°.

7. The spinner blade according to claim 5 in which the chordal line divides the blade into two segments, a major segment and a minor segment, said support aperture being in said minor segment and adjacent one end of said chordal line.

8. The fishing lure assembly according to claim 5 which includes at least two spinner blades on said leader in spaced apart relationship from one another.

9. The fishing lure assembly according to claim 8 wherein the angle of one of said blades faces the end of the leader opposite to said hook and the angle of the other of said blades faces the end of the leader adjacent said hook whereby one of said blades rotates in one direction when said line is moving in one direction and the other of said blades rotates in the opposite direction when said line is moving in the opposite direction.

10. A fishing lure assembly comprising in combination a leader, a hook on one end of said leader and a line connection loop on the other end of said leader, and a spinner blade on said leader between said hook and said line connecting loop, means on said leader to limit the movement of said spinner blade towards said hook whereby said spinner blade may rotate, said spinner blade comprising a disc formed from lightweight substantially semi-rigid sheet material, said disc having a chordal fold line thereacross, said disc being angulated along said fold line to form two substantially flat wings having an included angle of between 90° and 160° and a line aperture formed through one wing and situated towards one end of said fold line and between said fold line and the periphery of said one wing whereby, when said leader is held vertically, a major portion of said fold line inclines downwardly and outwardly from adjacent said line aperture, said blade being mounted upon said leader via said aperture with said included angle facing the end of said leader opposite to said hook, said one wing having a convexedly curved segment removed whereby the contour of said one wing, where said segment is removed, is substantially concave.

11. The fishing lure assembly of claim 10 in which said removed curved segment also crosses said fold line whereby a minor part of said other wing is also removed adjacent the other end of said fold line.

* * * * *

UNITED STATES PATENT AND TRADEMARK OFFICE
CERTIFICATE OF CORRECTION

PATENT NO. : 4,800,669

DATED : January 31, 1989

INVENTOR(S) : John R. E. Charron

It is certified that error appears in the above-identified patent and that said Letters Patent is hereby corrected as shown below:

On the title page, item [19], "Charrow" should read --Charron-- and in
item [76], the name of the inventor is corrected to read
--John R. E. Charron--

Signed and Sealed this

Ninth Day of January, 1990

Attest:

JEFFREY M. SAMUELS

Attesting Officer     Acting Commissioner of Patents and Trademarks